United States Patent [19]

Takeuchi et al.

[11] Patent Number: 4,649,780
[45] Date of Patent: Mar. 17, 1987

[54] CUTTING DEVICE FOR CUTTING AN ANNULAR BODY INTO BELTS

[75] Inventors: Koichi Takeuchi, Sennan; Megumi Yamanaka; Hisanobu Inada, both of Osaka; Masayoshi Kubo, Nagasaki; Hideaki Katayama, Nagasaki; Kenji Tokunaga, Nagasaki; Yoshinori Miyamoto, Nagasaki, all of Japan

[73] Assignee: Bando Chemical Industries, Ltd., Kobe, Japan

[21] Appl. No.: 754,865

[22] Filed: Jul. 12, 1985

[51] Int. Cl.[4] ............................................... B23B 5/00
[52] U.S. Cl. .............................................. 82/48; 82/93; 82/98; 83/862; 83/875; 83/522; 83/925 EB
[58] Field of Search .................. 82/46, 47, 98, 48, 93; 83/925 EB, 862–865, 54, 522

[56] References Cited

U.S. PATENT DOCUMENTS

| 1,401,480 | 12/1921 | King | 82/47 X |
| 2,661,579 | 12/1953 | Lomazzo et al. | 82/48 |
| 3,173,318 | 3/1965 | Lindemann | 82/98 |
| 3,545,321 | 12/1970 | Phelps et al. | 82/47 |
| 3,748,934 | 7/1973 | Lezberg | 82/48 |
| 4,214,191 | 7/1980 | Watanabe | 29/568 |
| 4,512,224 | 4/1985 | Terauchi | 82/48 |

Primary Examiner—James M. Meister
Attorney, Agent, or Firm—Auslander & Thomas

[57] ABSTRACT

A cutting device for use in cutting a cylindrical material around a mandrel into annular bodies of the desired width. This device has a first moving table to move in the axial direction of the mandrel, a second moving table to move on the first moving table in the radial direction of the mandrel, a cutter support carrying a first cutter adjustable in position in the radial direction of the mandrel and/or a second cutter adjustable in the axial direction of the mandrel, and a control unit with a device for detecting the position of each moving table, a device for receiving output signals from the detecting device and comparing the position with position data set beforehand and a driving circuit to move each moving table according to output signals from the comparing device.

7 Claims, 4 Drawing Figures

CUTTING DEVICE FOR CUTTING AN ANNULAR BODY INTO BELTS

BACKGROUND OF THE INVENTION

1. Field of the Invention:

This invention relates to a device for use in cutting an annular body for making V belts, flat belts, ribbed belts, toothed belts, etc., more particularly, a cutting device for use in cutting a cylindrical material around a mandrel into annular bodies of the desired width in such a fashion that their section meets at a right angle to the axial line of the mandrel.

2. Description of the Prior Art:

As is generally known, endless V belts which are annular bodies, for example, are divided into A type, B type and C type in terms of the cross sectional shape, and also divided by circumferential lengths of belt and by the conditions of use, such as ordinary condition, heat-resisting condition, etc. Thus, endless V belts are available in many different kinds but production of each kind is rather small, namely, endless V belts are produced on the typical multi-kind small-lot basis.

In the V belt manufacturing process, it is essential for manufacturing V belts of various types accurately and efficiently.

Conventionally, in cutting a cylindrical laminated material around a mandrel into many V belt bodies it is a usual practice to change cutting conditions (for example, width of the belt body, r.p.m. of a mandrel, time for cutting, cutting depth, etc.) manually by workers whenever the production type of V belt body is changed. This practice is applicable to the case where vulcanized cylindrical laminated material is cut into V belts. Regarding the system of setting the desired conditions, various methods (electrical method, mechanical method, etc.) are available but much time is required for the change of conditions and also skill is required to ensure no mistake in change. These have been main factors for lowering the rate of machine working and production efficiency.

SUMMARY OF THE INVENTION

An object of the present invention is to provide a cutting device which is capable of cutting annular bodies of multi-kind and small-lot accurately and efficiently in the cutting process of annular bodies.

The present invention relates to a cutting machine for use in the cutting process whereby a cylindrical material around a mandrel is cut, in such a fashion that the cut surface meets at a right angle to the axial line of the mandrel, into many annular bodies having the required width. In order to attain the above object, the cutting device comprises a first moving table which moves in the direction of axial line of the mandrel, a second moving table which moves on the first moving table in radial direction of the mandrel, a cutting means having a first cutter fitted to the second moving table in such a fashion that it is adjustable in its position in radial direction of the mandrel and/or a second cutter fitted in such a fashion that it is immovable in radial direction of the mandrel but is adjustable in its position in axial direction of the mandrel, a position detecting means to detect the position of each moving table, a position comparing means to receive output signals from the position detecting means and to compare them with preset position data, and a control device having a driving circuit to move each moving table according to output signals from the position comparing means.

A PREFERRED EMBODIMENT

A preferred embodiment of the present invention is described below with reference to the drawings.

Figure 1:
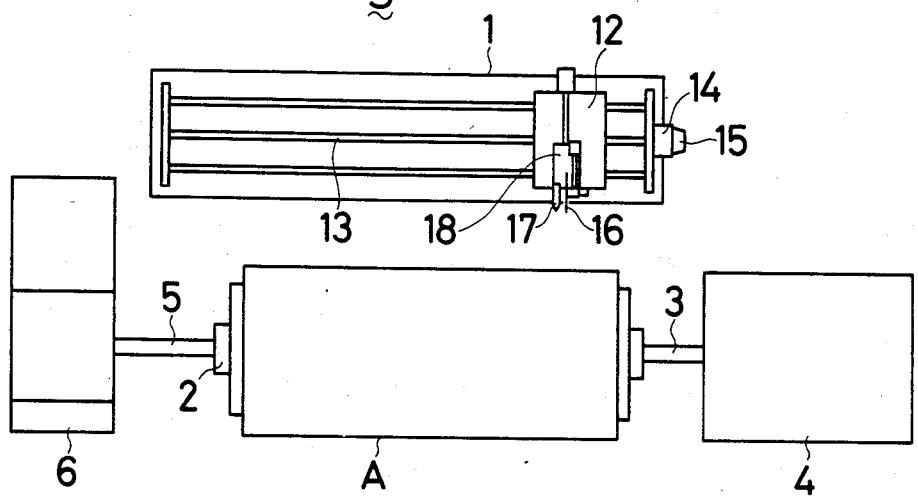
FIG. 1 is a rough plan view of a cutting device.

As shown in FIG. 1, a cutting device S which cuts a cylindrical laminated material A into many unvulcanized V belt bodies B comprises basically a cutter apparatus 1, a mandrel 2, a main shaft 3 which supports an end of said mandrel 2, a headstock 4 which turns both the main shaft 3 and the mandrel 2, a tail shaft 5 which supports revolvably the outer end of the mandrel 2 and a tailstock 6 which supports the tail shaft 5 and has a shunting mechanism to facilitate insertion and takeout of the mandrel 2.

Figure 2:
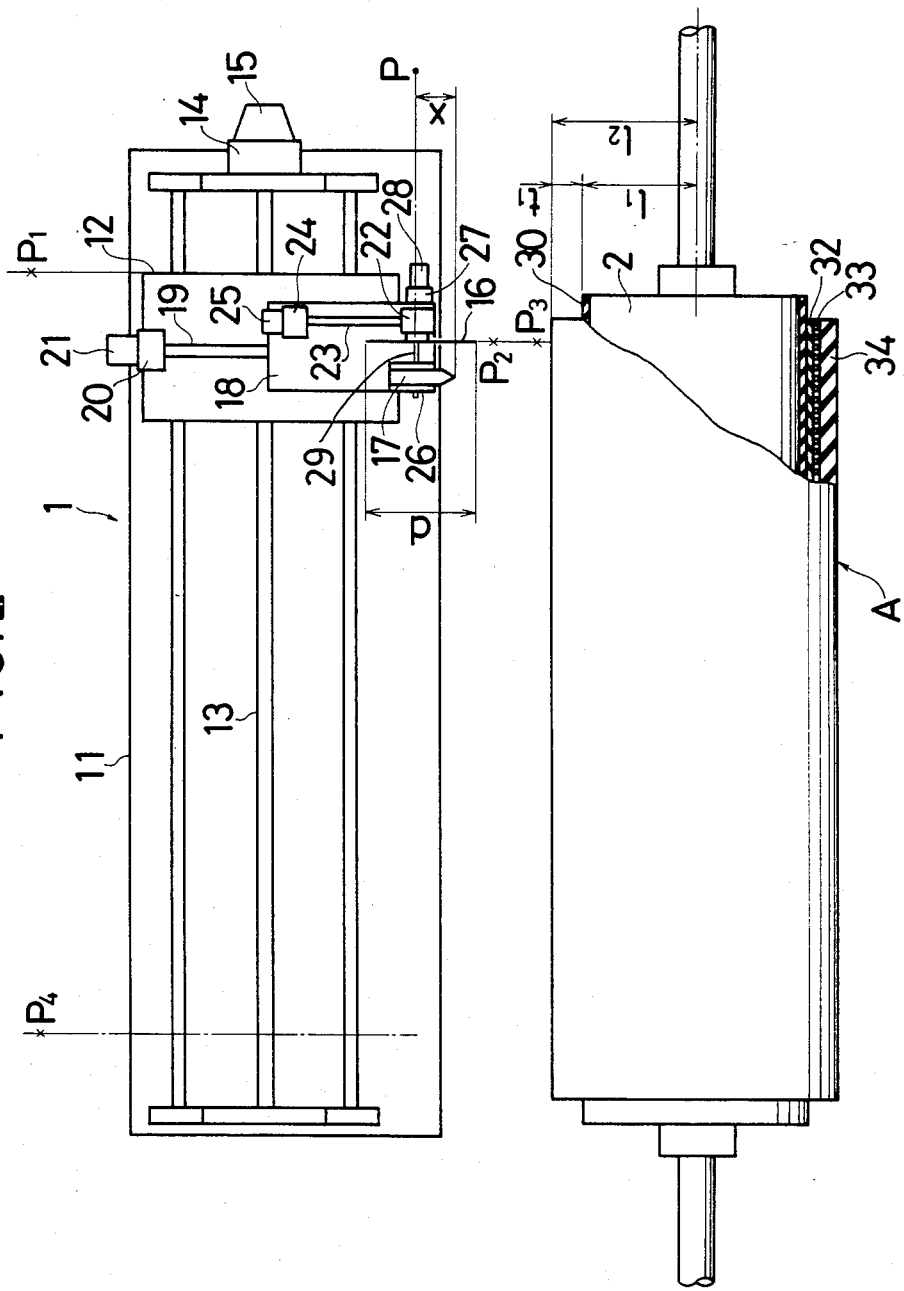
FIG. 2 is a drawing showing the relation between a cutting machine and a mandrel.

As shown in detail in FIG. 2, a screw rod 13 is fixed to a base table 11 and a female screw (not shown in the drawing) screwed to the screw rod 13 is fixed to a first moving table 12. By turning the screw rod 13, the first moving table 12 is movable in axial direction of the mandrel 2 to the base table 11. A DC servomotor 14 which turns the screw rod 13 and a pulse generator 15 which detects the quantity of rotation of the screw rod 13 are fitted to the base table 11.

A screw rod 19 is fixed to the first moving table 12. A female screw (not shown in the drawing) which is screwed to the screw rod 19 is fixed to a second moving table 18 to which a first cutter 16 (disc knife) and a second cutter 17 (V-shaped knife) are fitted. By turning the screw rod 19, the second moving table 18 can be moved in the direction at a right angle to the axial line of the mandrel 2, namely, in the radial direction of the mandrel. Fitted to the first moving table 12 are a DC servomotor 20 which turns the screw rod 19 and a pulse generator 21 which detects the quantity of rotation of the screw rod 19.

Fitted to the second movable table 18 are a setting table 22 on which the first cutter 16 is set revolvably and a driving device which adjusts the position of the setting table 22 in radial direction of the mandrel (namely, a screw rod 23 engaged with a female screw portion of setting table 22, a DC servomotor 24 which turns the screw rod 23 and a pulse generator 25 which detects the quantity of rotation of the screw rod 23). Also fitted to the second moving table 18 are a setting table 26 on which the second cutter 17 is set immovably, a screw rod (not shown in the drawing) which drives the setting table 26 in the axial direction of the mandrel 2, a DC servomotor 27 which turns said screw rod and a pulse generator 28 which detects the quantity of rotation of said screw rod 29. Under this arrangement, the second cutter 17 is immovable in radial direction of the mandrel 2 but is adjustable in position in axial direction of the mandrel 2.

The mandrel 2 is connected to a mandrel driving device including the main shaft 3 supporting the mandrel 2 and a DC motor in the headstock 4 and is equipped with a tachogenerator which detects the no. of revolutions of the main shaft 3.

Figure 4:
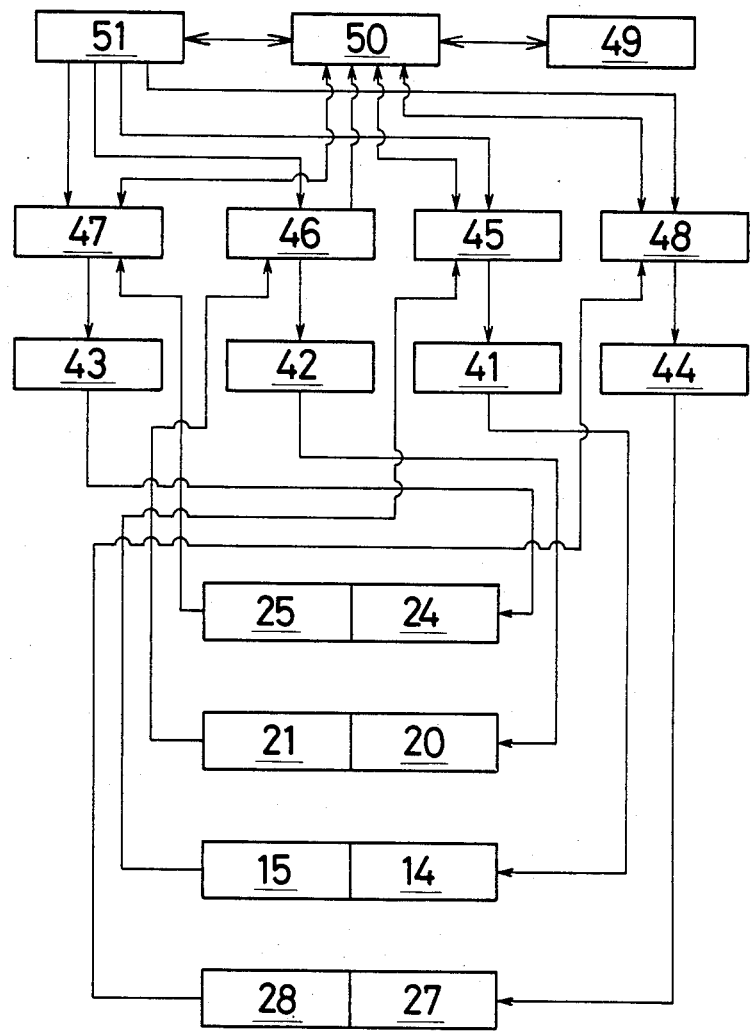
FIG. 4 is a block diagram of a control system.

FIG. 4 is a block diagram showing one example of the control system of each device explained above. Numerals 41, 42, 43 and 44 denote driving circuits of DC servomotors 14, 20, 24 and 27 respectively. Numerals 45, 46, 47 and 48 denote controllers of DC servomotors 14, 20, 24 and 27 respectively. Numeral 49 denotes an operating device in which a change-over switch from automatic running to manual running, a push button switch for start, stop, etc., indicators of running condition, and so forth are incorporated. Numeral 50 denotes a sequence circuit part which works sequentially the device S as a whole. Numeral 51 denotes a data processing device having a central processing unit (CPU) which carries out processing of data (circumferential length data, mandrel speed data, etc.) according to the program input beforehand.

Figure 3:
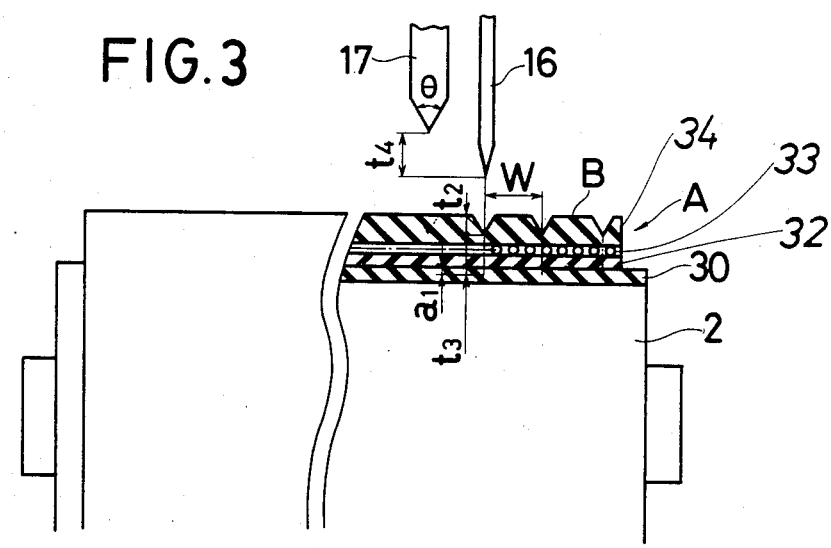
FIG. 3 is a detail drawing showing a part of the cutting device.

The V belt body B mentioned above is shaped by the following processes (refer to FIG. 3).

(1) The process of winding the desired unvulcanized rubber sheet 32 round the fixed metallic mandrel 2 on which a rubber sleeve 30 is mounted.

(2) The process of winding the desired cord 33 on the unvulcanized rubber sheet 32 spirally, extending from one end to the other end of the mandrel.

(3) The process of winding the desired unvulcanized rubber sheet 34 (or canvas) on the cord 33.

(4) The process of cutting a cylindrical laminated material A comprising wound unvulcanized rubber sheet 32, 34 and the wound cord 33 in the desired width and in circumferential direction by the first cutter 16 and cutting at the same time in V shape by the second cutter 17 to obtain unvulcanized V belt bodies B of the desired trapezoidal shape in section.

(5) The process of taking the belt body B off the mandrel 2.

The foregoing processes are generally called the shaping process and the cutting process of the above item 4 corresponds to a process in which a cutting device according to the present invention is used. All processes are usually controlled as a whole and all devices including the cutting device according to the present invention are controlled by a control unit comprising a microcomputer and others.

Action of the cutting device S is explained concretely.

The following five operations (1)-(5) are carried out as a preparatory work.

(1) Necessary data for each kind of various V belt bodies are input to the CPU beforehand by using keyboards, floppy disks, casettes or the like attached to the control unit.

(2) Regarding the cutting process, the belt body cutting width W corresponding to the V belt body B, the total number Z of belt bodies to be taken and the cubic contents V of a V belt body B are input beforehand to the CPU.

(3) In order to ensure cutting accuracy by the first and the second cutters 16, 17, and the allowable frequency of use for each cutter is input beforehand.

(4) The second cutter 17 is set on the setting table 26. At this time, it is so set that the pointed end of the second cutter 17 is positioned at the part about X from the starting point P of the second moving table 18 to the radial direction of the mandrel 2 (refer to FIG. 2). The position X from the starting point P is a fixed value determined mechanically.

(5) The first cutter 16 is set on the setting table 22. At this time, the diameter d of the first cutter 16 is input to the CPU from the keyboard.

When the winding of an unvulcanized rubber sheet, winding of cords and winding of a canvas are finished and the mandrel 2 on which the cylindrical laminated material A is mounted through the medium of a sleeve 30 is fitted, the mandrel number for the cylindrical laminated material A is transferred to the CPU, in which data that have been input beforehand to correspond to such number are selected, ready for operation instructions.

When an unvulcanized rubber sheet and a canvas are wound, outer circumferential length of the rubber sleeve 30 mounted on the immovable metallic mandrel 2 and also the outer circumferential lengths of the unvulcanized rubber sheet and the canvas after they were wound are measured automatically, operated in the CPU and are stored as the radius $l_1$ and the radius $l_2$ of the cylindrical laminated material A.

The cubic contents V of an unvulcanized V belt body B after cutting satisfies the following relative formula.

$$V = f(l_1, l_2, t_2, \theta, W)$$

where V, W, $\theta$ = data input beforehand
$l_1$, $l_2$ = data taken from the measurement of circumferential length Operation of the above relative formula is done in the CPU and the depth $t_2$ to which the second cutter 17 cuts into the cylindrical laminated material A is determined.

The positional relation between the pointed end of the first cutter 16 and the pointed end of the second cutter 17 in radial direction of the mandrel, in the state where the first moving table 12 advanced in radial direction of the mandrel in order to cut the cylindrical laminated material A, is as shown by the following formula.

$$t_3 = a_1 + t_1 - t_2$$

where
$t_1 = l_2 - l_1$
$a_1$ = depth to which the pointed end of the first cutter 16 cuts into the rubber sleeve 30. (This value is input beforehand to the CPU as one condition). (Refer to FIG. 3)

At first, the center of the first cutter 16 is so adjusted that the second moving table 18 is at the starting point P. The distance between the pointed end of the first cutter 16 and that of the second cutter 17 is $t_4 = (d/2) - X$. Both X and d are fixed values.

Then, the central position of the first cutter 16 is so adjusted that $t_4$ equals to $t_3$.

$$t_3 = t_4 + a_2$$

Namely, the central axis of the first cutter 16 is shifted by $a_2$ (not shown in the drawing) by driving of the DC servomotor 24. The distance between the first cutter 16 and the second cutter 17 in radial direction of the mandrel and kept equal to W (cut width of a belt body).

When the first moving table 12 moves in the direction of axial line of the mandrel and reaches the cutting starting point $P_1$, the second moving table 18 begins to move in radial direction of the mandrel and the top end of the first cutter 16 moves from the point which is $l_2+a_3$ (not shown in the drawing. $a_3$ is the distance by which the first cutter 16 is kept from contacting the outer surface of the cylindrical laminated material A when it moves laterally) from the axial line of the mandrel, namely, from the position where the axis of the first cutter 16 is shifted from the starting point P $a_2$ to the $P_2$.

Then, the mandrel 2 begins to turn. There exists the following relation between n (r.p.m. of the mandrel) and the time T seconds (time required for the top end of the first cutter 16 reaches the position of $l_1-a_1$ from the central axis of the mandrel and is stopped).

$$T=(60/n)\sim[(1.2\times60)/n]$$

The number of revolutions n is the value determined according to the size of the cylindrical laminated material A and is operated and controlled in the CPU.

Then, the second moving table 18 advances in radial direction of the mandrel and the top end of the first cutter 16 and the top end of the second cutter 17 move respectively to the position of $l_1-a_1$ andto the position of $l_2-t_2$ from the axial center of the mandrel, in other words, the moving table 18 moves from the point $P_2$ to the point $P_3$. After stoppage for T seconds, the moving table 18 again returns to $P_2$.

Then, the first moving table 12 moves from the cutting starting point $P_1$ toward the direction of $P_4$ by the distance corresponding to the cutting width W and the above action is repeated.

Thus, the above-mentioned action is repeated many times (corresponding to the number of belt bodies to be taken +1) and when the first moving table 12 reaches the position of $P_4$, the second moving table 18 begins to retreat and returns to its original position P, whereupon the mandrel 2 ceases turning.

In order to make the above cutting operation smooth, an apparatus of spraying to the first cutter 16 in cutting operation and an apparatus of discharging triangular scraps cut off by the second cutter 17 are provided as a part of the cutting device (these apparatuses are not shown in the drawing).

When the cutting operation in relation to one mandrel is finished in the above way, the predetermined frequency of use of the first and the second cutters is reduced by one and is fed back to the CPU, which operates the remainder of allowable frequency of use, which is shown by the indication means.

The above-mentioned various driving of the two moving tables was carried out by combination of a DC servometer which is excellent in position setting accuracy and a pulse generator but the combination of a stop motor and a pulse generator and the combination of a AC motor and a pulse generator are also practicable.

Since the present invention is composed as mentioned above, it produces the following effect.

1. Improvement of machine working ratio

Conventionally, about 15 minutes are required for the change of condition but under the present invention, the change of condition is effected in a moment and yet accurately. Thus, the rate of operation and productivity of the shaping machine are improved to a large extent.

2. Possibility of adaptation to multi-kind small-lot production

So far much time has been required for the change of condition for the change of production items and in order to meet such situation, it has been a usual practice to increase the production lot or to have machines in the number more than necessary. However, under the present invention no time is required for the change of condition and application to the multi-kind small-lot production at high efficiency is possible.

3. Reduction of the burden on operators

The cutting operation is a very important process for ensuring the quality of annular bodies such as V belts and the operators in charge of the cutting process have been required to undergo an educational training for a considerable period of time. The present invention not only dispenses with the service of veteran workers, but also can reduce the burden on operators to a large extent.

In the above-mentioned embodiment, explanation has been made on the case where the device according to the present invention is used for the cutting process but the device according to the present invention is applicable to:

(i) the case where a cylindrical body made of only elastic body is cut into flat belts, V belts, ribbed V belts, toothed belts, etc.

(ii) the case where a cylincrical laminated material including a rubber layer, a cord layer, a canvas layer, etc. is cut into flat belts, V belts, ribbed V belts, toothed belts, etc.

As the present invention can be embodied in various types without departing from the substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A cutting device for use in cutting a cylindrical body on a mandrel into annular bodies having the desired width in such a fashion that the cut surface meets at a right angle to the axial line of said mandrel, comprising:

(a) a first moving table screwed movably in axial direction of said mandrel on a first screw rod which extends in the axial line of said mandrel and is turned by a first motor.

(b) a second moving table screwed movably in radial direction of said mandrel on a second screw rod which is mounted on said first moving table, extends in radial direction of said mandrel and is turned by a second motor.

(c) a third moving table mounted on said second moving table in such a fashion that it is adjustable in its position in radial direction of said mandrel to a third screw rod which has a first cutter, extends in radial direction of said mandrel and is turned by a third motor.

(d) a fourth moving table mounted on said second moving table in such a fashion that it is adjustable in its position in axial direction of said mandrel to a fourth screw rod which has a second cutter, is fixed to said second moving table in radial direction of said mandrel, extends in axial direction of said mandrel and is turned by a fourth motor, and (e) a control device equipped with a means of detecting the position of each moving table, a position comparing means to receive output signals from said means of detecting the position and comparing the position with position data set beforehand and a driving circuit to move each moving table according to output signals from said position comparing means.

2. A cutting device as defined in claim 1, wherein the control device has a means of setting beforehand the allowable frequency of use for the first and the second cutters, calculating the remaining allowable frequency of use by reducing the number of times cut and indicating the remaining allowable frequency of use.

3. A cutting device as defined in claim 1, wherein the control device carries a means of receiving various data, including the mandrel number, outside diameters of the first and second cutters and radius of a cylindrical body on the cutting mandrel, a means of storing various conditions such as the cutting width to correspond to the mandrel number, volume of an annular body cut, number of annular bodies to be taken and duration of cutting a means of comparing various data received with various data stored, a means of giving action instructions to a driving circuit on the basis of the compared results and a control means to control the driving circuit in accordance with said motion instructions.

4. A cutting device as defined in claim 1, wherein the cylindrical body is a flat belt, a V belt, a ribbed V belt or a toothed belt, each made solely of elastic material.

5. A cutting device as defined in claim 1, wherein the cylindrical body is a cylindrical laminated material comprising at least a rubber layer, a cord layer and a canvas layer.

6. A cutting device as defined in claim 5, wherein the annular body is an unvulcanized V belt body.

7. A cutting device as defined in claim 5, wherein the annular body is a flat belt, a V belt, a ribbed V belt or a toothed belt.

* * * * *